United States Patent [19]

Savoie

[11] Patent Number: 6,047,509
[45] Date of Patent: Apr. 11, 2000

[54] CORNER SUPPORT FOR PANEL FRAMES

[75] Inventor: Troy S. Savoie, Burnsville, Minn.

[73] Assignee: Media/Graphics, Inc., Minneapolis, Minn.

[21] Appl. No.: 09/131,037

[22] Filed: Aug. 7, 1998

[51] Int. Cl.[7] .................................................. E04B 1/00
[52] U.S. Cl. ........................... 52/281; 52/239; 52/282.3; 52/282.4; 52/285.4; 52/476; 52/585.1; 52/656.9; 52/769; 403/231; 403/401; 403/402
[58] Field of Search .......................... 52/239, 281, 656.9, 52/282.3, 282.4, 285.4, 476, 769, 585.1; 403/231, 402, 401

[56] References Cited

U.S. PATENT DOCUMENTS 4,076,438  2/1978  Bos ......................................... 403/402

Primary Examiner—Christopher T. Kent
Assistant Examiner—Nkeisha J. Maddox
Attorney, Agent, or Firm—Westman, Champlin & Kelly, P.A.

[57] ABSTRACT

A panel used for display purposes comprises a frame having corner members that are molded in identical halves and snapped together. The corner members are provided with T-slots along the outer edges that will receive slidable members. A detent extends into the T-slot to engage the slidable members slid into the T-slot to hold them in position. The corner members include tangs for receiving extrusions for forming edge frames for the panel, with the corner members holding the frame in an assembly. The corner members have receptacles for receiving pins or shanks that can be latched in place with a latch member sliding in the T-slot on at least one of the legs of the respective corner member.

12 Claims, 4 Drawing Sheets

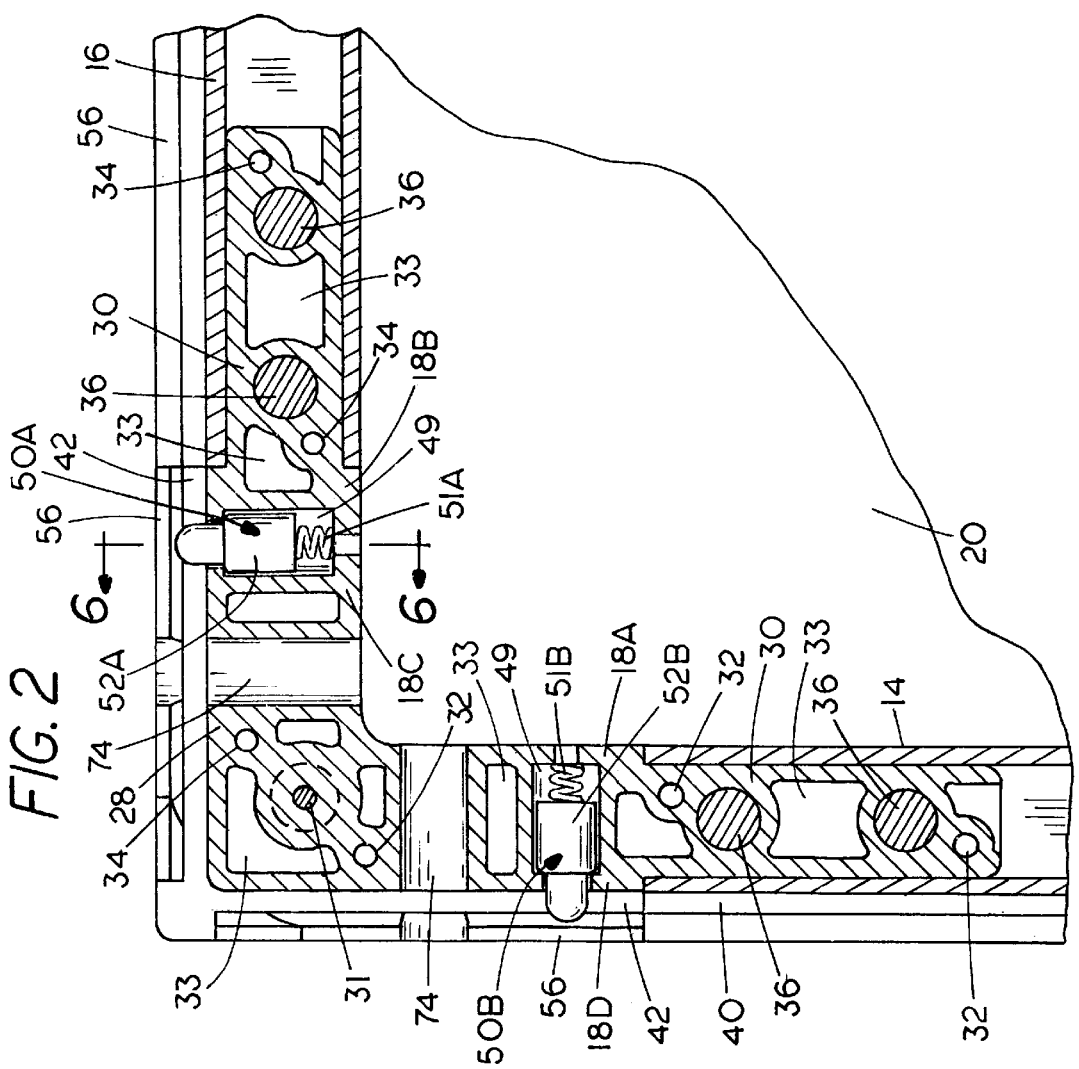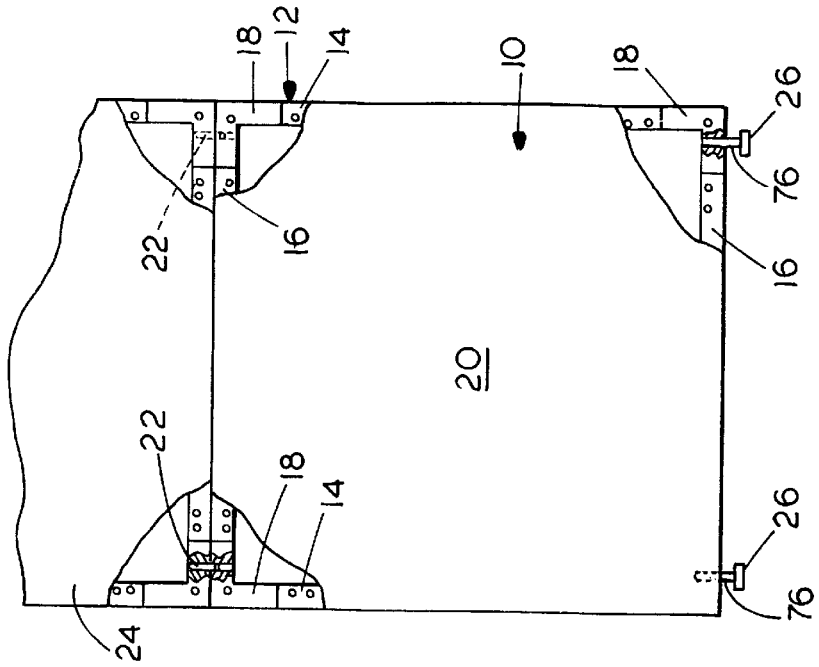

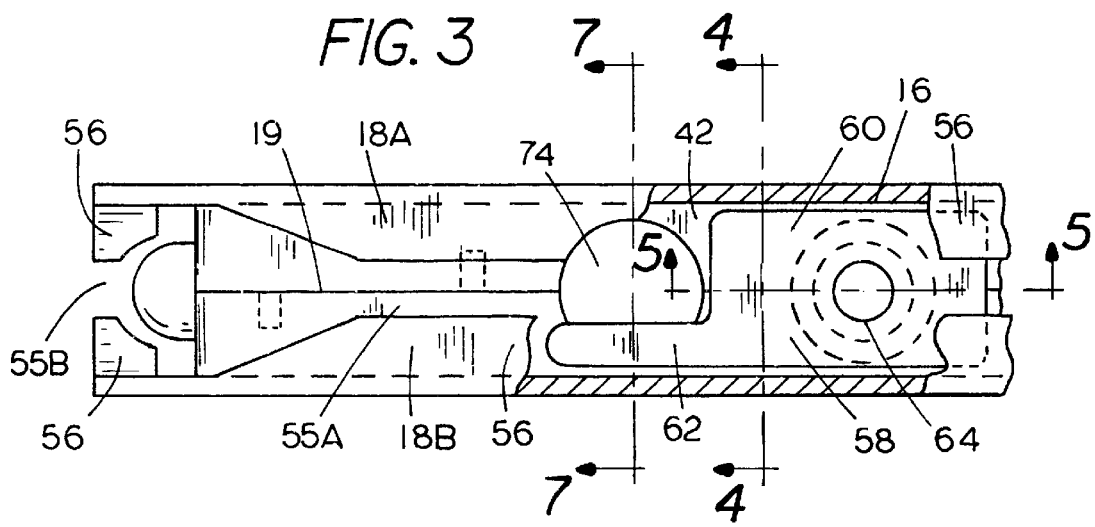
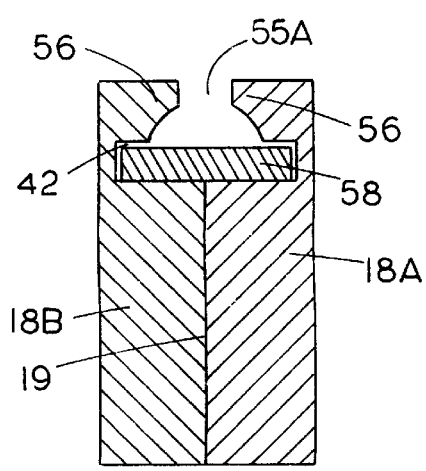
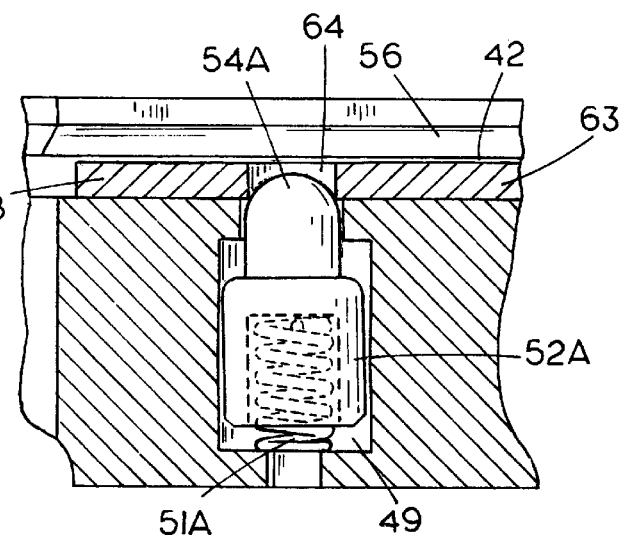
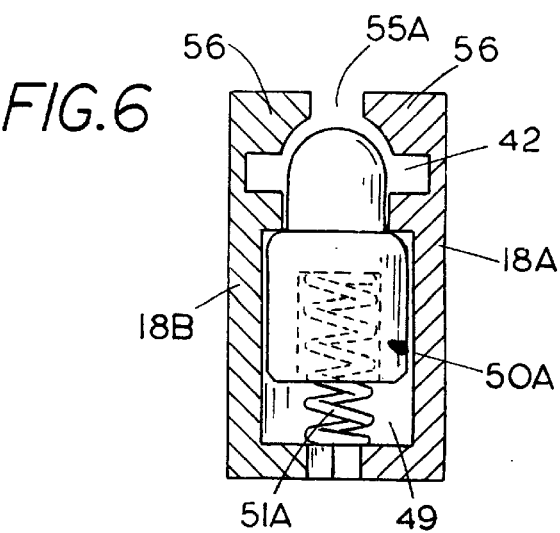

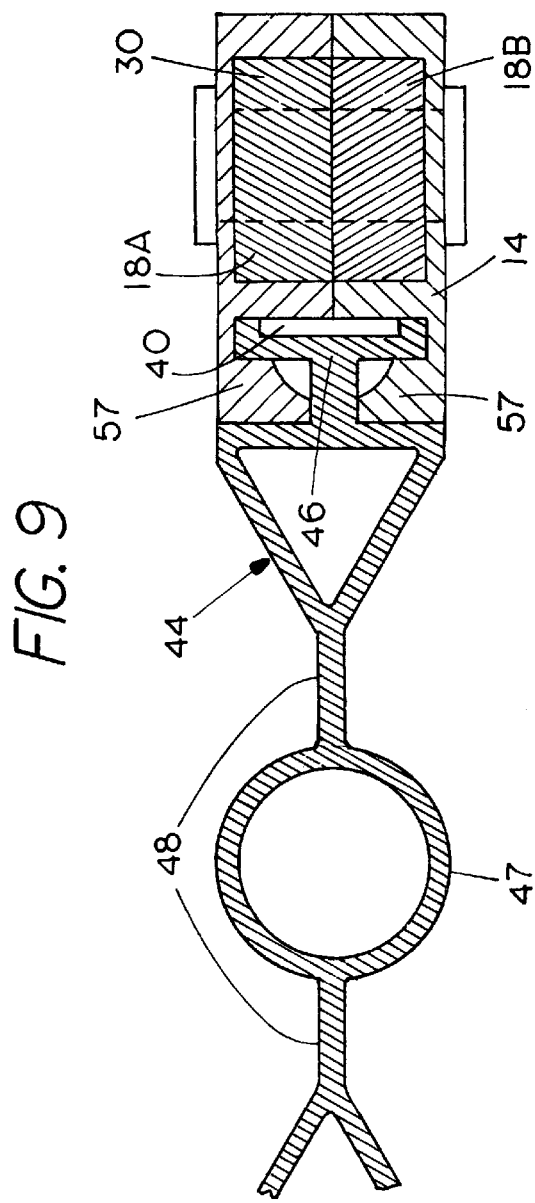

CORNER SUPPORT FOR PANEL FRAMES

BACKGROUND OF THE INVENTION

The present invention relates to a corner support for forming panel frames used in making display panels, for example. The corner support is molded in two identical parts that can be snapped and riveted together. Detents are used for holding modular components in place in provided tracks, such as edge hinges or connectors, extension pins, or support feet.

Panels and panel frames have been advanced for use as displays at trade shows and the like, and various constructions are used. Generally the panels will have a rectangular frame that can be planar or curved, and the frames usually have edge members that will permit installing a flexible molded hinge or rigid connector to connect adjacent panels together. Additionally, there are systems for stacking panels, one on top of the other for extended height when desired.

Many of the existing panels are complex in construction and use, in that they will require elaborate frame members and special connectors or adapters if panels are to be extended vertically.

SUMMARY OF THE INVENTION

The present invention relates to a panel frame construction, and in particular a corner member assembly that is used for forming rectangular shape frames. The corner member is made in two identical sections that snap together to form a finished member that has two legs extending at 90° to each other. T-slot tracks are formed along the outer edges of the corner member for retaining slide-in components. Detent pins are provided at both edges of the corner member and the pins can be used to retain the slide-in member components in the assembled track. The detent pins can provide a snap-in holding of hinge members or connectors that extend along the vertical edges of the frame and vertical leg of the corner member, for hinging or connecting two adjacent panels together.

A slide locking member is provided for use in the track on the legs of the corner member and is used for holding a pin that will protrude from an upper edge of the corner member. The pin can be used for aligning a panel that is stacked on top of a base panel. The slide lock also can retain a pin or shank of a support foot or glide (or caster) in place on the horizontal leg of the corner member at the bottom edge of the panel.

The corner members are molded as identical parts that can be snapped together for forming the corner with the detent pin and spring in a provided pocket formed by the parts. The corner members have projecting shanks from each leg that will receive extended edge frame members to form the panel edges.

Four of the corner members are used on each panel, along with four edge frame members that have T-slot tracks aligning with the T-slots or tracks in the corner members.

The corner members thus are sturdy, easily molded for low cost and precise dimensions, so that they can form finished corners without any additional finishing processes, and which are adapted for modular use for mounting different parts.

BRIEF DESCRIPTION OF THE DRAWINGS

FIG. 1 is a plan view of a typical display panel having a frame with corner members made according to the present invention;

FIG. 2 is a vertical sectional view of a corner member used in the panel of FIG. 1;

FIG. 3 is a plan view taken on line 3—3 in FIG. 2 with parts in sections and parts broken away;

FIG. 4 is a sectional view taken as on line 4—4 in FIG. 3;

FIG. 5 is a sectional view taken as on line 5—5 in FIG. 3;

FIG. 6 is a sectional view taken on line 6—6 in FIG. 2;

FIG. 9 is a sectional view taken along line 9—9 in FIG. 8.

DETAILED DESCRIPTION OF THE PREFERRED EMBODIMENTS

Figure 8:
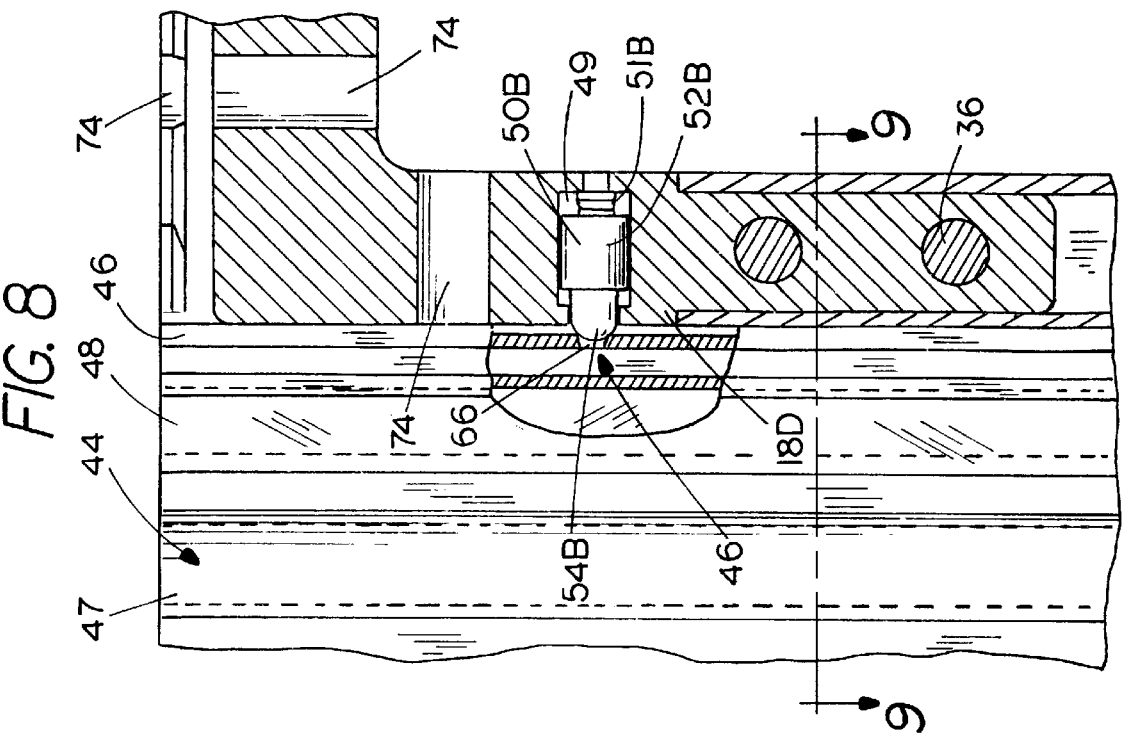
FIG. 8 is a sectional view similar to FIG. 2 with a hinge member positioned in a track on a vertical leg of the corner member; and mounting of a foot member at a lower edge of a panel.

FIG. 1 illustrates a typical trade show display panel assembly 10. The panel assembly 10 has a rectangular frame 12 that includes vertical edge frame members 14 that are generally extrusions formed in a particular desired shape, and horizontal edge frame members 16 which have identical cross sections to the vertical members 14. The frame members 14 and 16 are held together with four corner members 18 made according to the present invention. A skin or covering indicated at 20 is applied to the frame members 14 and 16 and overlies both sides of the frame members 14 and 16 and the corners 18 for a finished appearance. The skin 20 can be removable if disassembly is desired.

Also shown in FIG. 1 are extension panel support pegs 22, which are supported in the corner members 18 as will be explained, and on which an additional or upper panel illustrated at 24 can be mounted by slipping the extension pins into provided bores or receptacles in the corner members 18 of the upper panel. Support feet indicated at 26 that have support pins made the size as pins 22 also can be held to the lower corner members 18 to support the panel 10.

In FIG. 2, one half section of corner member 18 is illustrated and it is formed as a molded plastic member that has a corner housing 28 and legs ending in outwardly extending tangs 30. The corner members 18 are made into two identical half sections 18A and 18B that face each other, as can be seen perhaps in FIGS. 3 and 4. The half sections have two legs 18C and 18D at right angles with interlocking pins and receptacles that interfit when the legs are facing each other, in that the horizontal leg of FIG. 2 on section 18A is a mirror image of the vertical leg, so the pins 32 will fit into receptacles 34 of the mating half 18B, and vice versa. The half sections are easily molded and can be snapped together and held with a rivet 31. A parting line is inducted at 19 in FIG. 3.

The corner members 18, and the half sections 18A and 18B are formed to provide interior guides and receptacles for various components. Cored openings for weight reduction is shown at 33 in FIG. 2 only, and in FIG. 2, the corner member surface that is on the parting line is cross-hatched to help delineate the parts. The cross rivet or other fastener 31 will securely hold the two sections 18A and 18B together.

The tangs or keys 30 of the corner member 18 are sized so that when in assembly, the tangs or keys 30 slide into the open end receptacle of the extrusion forming one of the frame members, such as aluminum extrusion frame members 14 and 16. A frame member 14 is shown in cross section in FIG. 9, which is identical in cross section to the frame members 16. The tangs or keys 30 thus align the frame members 14 and 16 in assembly extending in the rectangular configuration shown in FIG. 1. The frame members can be held in place with rivets 36 extending through provided cross holes in the tangs or keys 30.

The extruded frame members 14 and 16 have a T-shaped slot or track open to the outer edges, which is shown at 40 in FIG. 9. The respective T-shaped slot or track 40 aligns with a T-shape slot or track 42 that is formed in each leg 18C and 18D of the corner members 18 above the tangs or keys 30. Slots 42 are the same size as the slots 40 in the aluminum extrusions forming frame members 14 and 16.

As shown in FIGS. 8 and 9, the T-shaped slots 40 and 42 are of size to receive a flexible plastic molded hinge member 44 that has a T-head 46 that slips into the slot 40 on one channel and a T-head of the same configuration on an opposite edge that slips into the slot of a channel of a second panel. The T-heads 46 are joined by flexible walls 48 and a center cylindrical member 47 so that the hinge member 44 will provide a continuous hinge along upright edges of adjacent panels to join them together. Rigid connectors also can be slid into place in the tracks or T-slots.

The corner members 18, and each of the legs 18C and 18D have pockets 49 formed to receive springloaded detent assemblies 50A and 50B, respectively (see FIGS. 2 and 6). The detent assemblies 50A and 50B include springs 51A and 51B and plungers 52A and 52B. The plungers 52A and 52B are retained in the pockets 49, and can be installed as the corner half sections are assembled. Rounded ends 54A and 54B are at ends of the plungers 52A and 52B and protrude through openings into the slot or track member 42 on the leg of the respective corner members 18. A gap 55A and 55B of the T-slots 42 is formed between the flanges 56. The frame members 14 and 16 have a similar gap between T-slot flanges 57 (see FIG. 9). The flanges 56 overlie the base of the slots 42 and provide access for a tool so the plungers 52A and 52B can be manually retracted by exerting a force to compress the springs 51A and 51B.

The slots or tracks 42 of the corner members form a slide retainer for not only the hinge members 44 as previously mentioned, but also for a slide lock or latch 58 (see FIGS. 3, 4 and 5). The latch 58 has a flat base section 60 that is the full width of and slides along the slot or track 42, and also has a lock tang 62, which extends out from the base portion 60 and is less than half the width of the base of slot 42. The base section 60 of slide lock or latch 58 has a through hole 64 that is of size to receive the end portion 54A or 54B of the plungers 52A and 52B for detenting the slide lock or latch 58 into a latched position as it is slid along the slot 42. The hinge member 44 that is slid into the slot 42 of the corner member leg 18D, and into the aligning slot 40 on vertical frame member 14 can be slid for the full length of the panel 10, or up into an extension panel, but the T-head 46 has cross grooves 66 (FIG. 8) at a selected position. The grooves 66 are a known distance relative to the horizontal edges of the corner members 18 so that when the hinge member 44 slips into place to the correct position, the detent plunger 52B at both the top and bottom corner members 18 will snap into the grooves 66 and retain the hinge in position along the length of the vertical frame members.

When a latch member 58 is used, as shown in the top leg 18C in FIGS. 3, 4 and 5, the opening or hole 64 of the latch member 58 will permit the end 54A of the detent plunger 52A of the corresponding leg 18C, as shown in FIG. 5 to enter the opening 64 and retain the latch member 58 from sliding along the track or slot 42.

Figure 7:
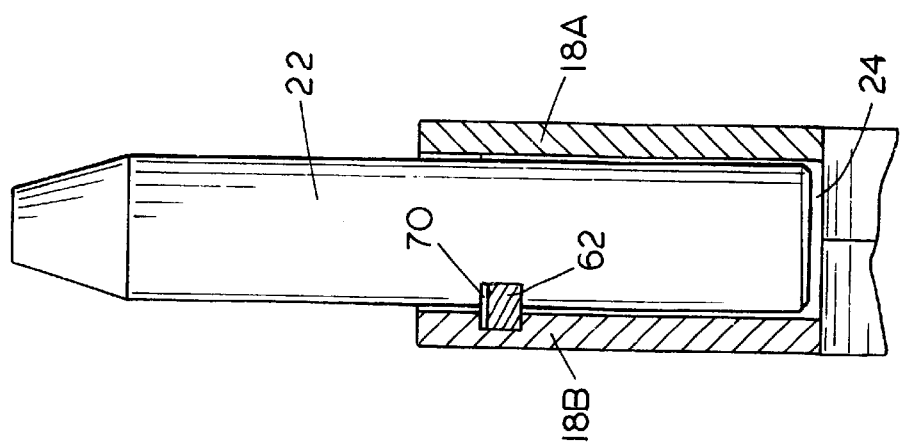
FIG. 7 is a view taken on line 7—7 but showing an extension panel mounting pin in place.

The latch member 58 is used for retaining either a pin 22 used for alignment of an extension panel, or for retaining the pin or shank of a foot member. As shown in FIG. 7, the pin 22 has a groove 70 along one side, which is of size to receive the tang 62 of the latch member 60 when the pin 22 is slipped into place in a base or receptacle 74, the legs of the corner member 18. The base 74 extends through the flanges 56 and is of size to receive the pin 22 and hold the pin 22 along a sufficient length for stability. The latch member 58 is retracted so the tang 62 is clear of the top of receptacle 74 when the pin 22 is inserted and then when the pin 22 is in place, the latch member 58 is slid to the latched position with the tang 62 in the slot 70. The detent plunger end 54A is then also partially in hole 64. The pin 22 then can be used for slipping into a corresponding bore of the corner member 18 of another upper panel such as panel 24 for vertical extension of the panels.

The support feet 26 also have shanks or pins 76 with a groove identical to groove 70. The shanks 76 are the same size as the pins 22 and slip into receptacles 74 in the lower corner members 18 when the latch 58 in that slot 42 is retracted. When seated, the slot or groove of shank 76 will receive the tang 62 of the latch member 58 of the lower corner members.

As shown in FIG. 7, the latch member 58 is made so that the opening 64 is countersunk to have tapered edges to permit the latch member 58 to be released from the rounded end 54A or 54B of the respective detent plunger when a force is applied to slide the latch member 58. The latch member 58 also will have a tapered ramp surface 63 at its leading end so that the rounded end 54A of the plunger 52A will slide under the latch for ease of installation from the open end of the track, right at the corner. The latch member 58 can be released by pushing on it from one end or the other, as desired, or by using a tool and by retracting the plunger.

When two panels are stacked one on top of the other using the pins 22, the hinge member 44 will be of sufficient length so that it will span both of the vertically stacked panels and hold them in assembly across the junction between the panels.

The latch members 58 can be molded parts, and while shown flat, if desired, they can have a rib that will extend into the gap or opening 55A or 55B defined between the flange members 56 of corner members 18. Slopes or tapers are also put on the ends of the hinge extrusions so that they will slide over the detent plungers to snap into place when they are slid into the aluminum extrusions on the corner frames. The hole 64 in the latch member also permits one to put a tool into the hole to push on and retract the end of the plunger 52A or 54A. The hinge members 44 usually can be slid across the ends of the detent plungers for release without having to push the plunger 52B in, but suitable apertures or openings can be provided in the hinge member 44 for retracting the plunger 52B as well.

The corner members 18 thus provide a basic component for making panel frames that are efficient, attractive, and can easily be assembled and used in a variety of installations.

Although the present invention has been described with reference to preferred embodiments, workers skilled in the art will recognize that changes may be made in form and detail without departing from the spirit and scope of the invention.

What is claimed is:

1. A corner member fore a panel assembly comprising a housing having a pair of legs extending at substantially right angles to form a corner outer edge and including supports for holding frame channels at outer ends of the legs, the supports terminating at position spaced from the corner outer edge, a track formed on an outer side of at least one leg of the corner member to align with a conforming portion of a frame channel, the track extending from the corner outer edge to the support, said track having side walls with inturned flanges that are spaced apart, a detent member mounted for spring-loaded movement laterally of a length of the track and protruding to position between the side walls, and a slide member for sliding in the track between the side walls, the slide member including a recess that receives an end of the detent member for holding the slide member from moving along the track.

2. The corner member of claim 1, wherein said slide member comprises a latch having a locking tang portion for interfitting with and retaining members extending across the track between the side walls in a direction generally perpendicular to the length of the track.

3. The corner member of claim 1, wherein the corner member is made in identical half section formed along a bisecting plane parallel to the plane define by both legs, said half sections being positioned to face each other and to be joined together to form the corner member.

4. the corner member of the claim 1, wherein there is a detent member mounted in each of the legs of the corner members, the detent members protruding into the track along of said legs.

5. The corner member of claim 1 and in combination, a slide for sliding along the track, said slide having a receptacle for receiving the end portion of the detent member for holding the slide in place.

6. The corner member of claim 5, wherein the legs of the corner members each have a bore transverse to the track that is formed partially in the overhanging flanges, and a pin for mounting in said bore, said pin having a receptacle along a side thereof, and said slide having a tang that fits in the receptacle and holds the pin in position when the slide member is held with the detent member.

7. The corner member of claim 1 wherein the leg that has the track has a bore extending transversely to the track and aligned between the sidewalls, a pin mounted in said bore that extends outwardly from the inturned flanges, said pin having a slot, and the slide member having a tang that moves into said slot to lock the pin from movement out of the track and holds the pin perpendicular to the length of the track with the detent member in the recess of the slide member.

8. The corner member of claim 7 wherein said pin comprises a pin for sliding into a bore of an adjacent panel assembly.

9. A corner member for forming a panel assembly, said corner member comprising a housing having a pair of legs joined together and extending at substantially right angles to each other, and having supports for frame members at outer ends of each of the legs which are spaced from an outer side junction of the legs, a T-shaped slot track formed along outer edges of each of said legs between the supports and the junction of the legs including a slot track base portion, and a gap formed by overhanging flanges spaced from the base portion, and a detent member mounted in each of the legs for spring loaded movement laterally of a length of the respective track and having a portion that protrudes into the base portion of the track to retain a member held between the flanges and base portion from sliding along the base portion.

10. The corner member of claim 9 wherein the supports comprise attachment tangs for supporting frame members at each of the legs.

11. The corner member of claim 9 wherein said corner member is made of two identical halves which mate together along a parting line for forming the corner member into an assembly.

12. A corner member for a panel assembly comprising a housing having a pair of legs extending at substantially right angles and including supports for holding frame channels at outer ends of the legs, a separate track formed on an outer side of each of the legs of the corner member, said tracks each having an opening facing outwardly, a separate detent member mounted in each track for spring-loaded movement laterally of a length of the track, and a slide member for sliding in the tracks, the slide member for at least one of the tracks comprising a slidable, flexible hinge member, said hinge member having a cross recess for receiving an end of the detent member when the hinge member is in usable position.

* * * * *

UNITED STATES PATENT AND TRADEMARK OFFICE
CERTIFICATE OF CORRECTION

PATENT NO. : 6,047,509
DATED : April 11, 2000
INVENTOR(S) : Troy S. Savoie

It is certified that error appears in the above-identified patent and that said Letters Patent is hereby corrected as shown below:

Column 5, line 3, after "of" insert --integral--.

Signed and Sealed this

Twenty-ninth Day of May, 2001

Attest:

NICHOLAS P. GODICI

*Attesting Officer*     *Acting Director of the United States Patent and Trademark Office*